United States Patent [19]
Beaubien

[11] 3,733,629
[45] May 22, 1973

[54] BUOYANT MATRIX MATERIALS
[75] Inventor: Laurent A. Beaubien, Arlington, Va.
[73] Assignee: The United States of America as represented by the Secretary of the Navy, Washington, D.C.
[22] Filed: May 27, 1971
[21] Appl. No.: 147,692

Related U.S. Application Data
[63] Continuation-in-part of Ser. No. 884,526, Dec. 12, 1969.

[52] U.S. Cl. .................................................. 9/8 R
[51] Int. Cl. .......................................... B63b 21/00
[58] Field of Search ................. 161/168, 162; 9/8; 244/123; 229/18 X

[56] References Cited
UNITED STATES PATENTS

| | | | |
|---|---|---|---|
| 2,806,509 | 9/1957 | Bozzacco et al. | 154/28 |
| 2,985,411 | 5/1961 | Madden | 244/123 |
| 2,151,066 | 3/1939 | Anderson | 229/18 X |
| 3,302,843 | 2/1967 | Sheehan | 229/8 |

Primary Examiner—Duane A. Reger
Assistant Examiner—Gregory W. O'Connor
Attorney—R. S. Sciascia, Arthur L. Branning and Philip Schneider et al.

[57] ABSTRACT

A matrix material for a buoyant composite structure formed with spheres of buoyant material.

3 Claims, 1 Drawing Figure

PATENTED MAY 22 1973 3,733,629
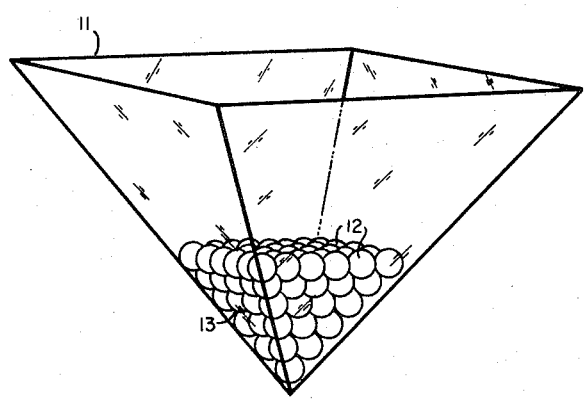
INVENTOR
LAURENT A. BEAUBIEN
BY *Melvin L. Crane* AGENT
*[signature]* ATTORNEY

BUOYANT MATRIX MATERIALS

CROSS-REFERENCES OF RELATED APPLICATION

This application is a continuation-in-part of application Ser. No. 884,526 filed Dec. 12, 1969.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is directed to a buoyant composite structure and more particularly to a matrix material for a buoyant composite structure.

Heretofore, various types of buoyancy materials and systems have been used in carrying out oceanic research or for buoys and other flotation devices. Deep-sea exploration and research has brought about a need for new developments in materials such as solid, buoyant materials and hollow structures capable of withstanding pressures at great depth. One material that shows great potential for buoyancy and structural applications in the ocean is syntactic foam, a composite, light-weight material which consist of a low density hollow microsphere filler embedded in a resin matrix. Research in such a syntactic foam and its many uses has been described in an article titled "Syntactic Foams For Deep Sea Engineering Applications" by Israel Resnick and Alexsander Macander which appears in the Naval Research Reviews, May, 1968. It has been pointed out in the above article that buoys made with a polyester resin including varying sized randomly placed hollow glass microspheres having a size from 30 − 300 microns has a net buoyancy of 22 pounds per cu. ft. The article further points out that variations in density and strength of syntactic foam materials depend on the different grade of hollow glass microsphere used in the material and also on the packing fraction of the glass sphere filler.

Further, it is known in the prior art that glass spheres have been used in plastic laminating compositions for high strength-weight ratios as required. The structures have been made by randomly placing the hollow spheres within the synthetic plastic and with no particular interest in the buoyancy qualities of the material.

This invention is an improvement over application Ser. No. 884,526 filed Dec. 12, 1969 which is directed to a buoyant structure and method of pouring spheres into a container which may be used for producing a buoyant structure. The above buoyant composite structures usually make use of an epoxy resin which forms a solid matrix around the specially aligned spheres. The epoxy resins used, heretofore, have a relatively high specific gravity. Shrinkage during curing produces a deleterious prestressing of the spheres and the matrix has a disadvantage in transmitting shear, a situation which promotes the existence of contact stresses between spheres during both the curing process and during in place hydrostatic loading.

SUMMARY OF THE INVENTION

This invention is directed to a matrix material for a buoyant composite structure which avoids stresses during and after curing and provides a matrix which has a lower specific gravity than previously used matrix resins. Therefore, this invention provides a more buoyant structure which avoids the disadvantages of composite structures now used for buoyancy.

STATEMENT OF THE OBJECTS

It is therefore an object of this invention to provide a buoyant composite structure.

Another object is to provide a matrix which does not produce deleterious effects on spheres used in the composite structure.

Still another object is to provide a buoyant structure which may be fireproof, insoluble in water and suitable for forming uniform large structures.

BRIEF DESCRIPTION OF THE DRAWINGS

The drawing illustrates a buoyant composite structure made in accordance with the teaching of this invention.

DESCRIPTION OF THE DRAWING

Now referring to the drawing there is shown by illustration a buoyant composite structure made in accordance with the teaching of this invention. As shown, the drawing illustrates a pyramidal housing 10 which includes therein a plurality of spheres 12. The spheres are aligned in adjacent layers in which each layer contains aligned rows of spheres. The spheres lie in the contours of adjacent spheres and are arranged such that each layer removed from the apex end of the housing increases by one additional row of spheres with the spheres in contact with each other. Once the spheres have been properly aligned within the container the matrix material 13 is added. The matrix material flows through the voids between the spheres until all voids are filled between all layers of spheres. The composite assembly is then cured.

The matrix material used in carrying out this invention is a gel having a density or specific gravity of about one, and when properly catalyzed and cured developes into a soft transparent, jelly-like mass housing excellent thermal and dielectric properties over a wide extreme temperature. It has been determined that a suitable gel is of the type set forth in U.S. Pat. No. 3,020,260. Such a gel is a silicone gel called SYLGARD-51, which is an organo-silicon oxide polymer made by combining silicon dioxide with methyl or ethyl groups of molecules derived from alcohols as defined in *Handbook of Material Trade Names*, Supplement IV, page 320, published in 1965 by Zimmerman and Lavine — Industrial Research Service, Inc. Sylgard-51 has a density or specific gravity of 0.97 and is known to be poured into electronic assemblies then gelled in place to form a resilient, self-healing protective cushion.

A buoyant composite structure formed of hollow spheres with SYLGARD 51 provides a highly buoyant structure. The gel does not shrink during curing, therefore, there are no stresses applied to the spheres in the structure. Therefore, the structure will withstand greater outside forces. Further, the gel has a zero capability of transmitting shear, such that the embedded spheres are subjected only to an uniform, unintensified hydrostatic pressure.

For a slightly less buoyant structure, the spheres may be placed into a container or compartment in a haphazard manner and then the interstices filled with the above or any other similar gel having a density less than one.

Since the gel has a specific gravity less than one and does not apply any stresses on the spheres and the gel does not transmit any shear to the embedded spheres, the gel provides an improved matrix for a buoyant composite structure. If the consistency of the gel is sufficient the structure need not be containerized.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A buoyant composite structure; which comprises,
a housing,
a plurality of substantially identical sized hollow spheres linearly aligned in said housing in side-by-side rows with rows of spheres stacked upon rows of spheres with the spheres of the stacked rows nesting in contours formed by adjacent rows, and
a buoyant curable material filling any voids between said stacked rows of spheres,
said buoyant material having a specific gravity of about one and a zero shrinkage during curing of said material.

2. A buoyant composite structure as claimed in claim 1; wherein,
said buoyant material has a zero capability of transmitting shear.

3. A buoyant composite structure as claimed in claim 2; in which,
said housing is of a pyramidal shape.

* * * * *